United States Patent [19]
Banks

[11] 3,802,262
[45] Apr. 9, 1974

[54] ELECTROMAGNETIC FLOW RATE METER

[75] Inventor: Bruce A. Banks, Olmsted Township, Ohio

[73] Assignee: The United States of America as represented by the Administrator of the National Aeronautics and Space Administration, Washington, D.C.

[22] Filed: Dec. 30, 1971

[21] Appl. No.: 214,089

[52] U.S. Cl............ 73/194 EM, 310/11, 324/34 FL
[51] Int. Cl................................................ G01f 1/00
[58] Field of Search...... 73/194 EM; 324/34 FL, 40, 324/164; 310/11

[56] References Cited
UNITED STATES PATENTS

| 3,149,247 | 9/1964 | Cobine et al. | 310/11 |
| 3,233,127 | 2/1966 | McKechnie | 310/11 |
| 3,428,835 | 2/1969 | Dzung | 310/11 |
| 3,549,914 | 12/1970 | Jones, Jr. | 310/11 |
| 2,149,847 | 3/1939 | Kolin | 73/194 EM |
| 3,631,718 | 1/1972 | Sato et al. | 73/194 EM |

Primary Examiner—Charles A. Ruehl
Attorney, Agent, or Firm—N. T. Musial; J. A. Mackin; John R. Manning

[57] ABSTRACT

A liquid metal whose flow rate is to be determined is directed through a chamber made of electrically-insulating material on which there is impressed a magnetic field perpendicular to the direction of flow of the liquid metal. The magnetic field is made to increase in strength in a downstream direction of the flow of liquid metal. At least a pair of electrodes are disposed in the chamber traversely and perpendicular to the direction of flow and an ammeter is connected between the electrodes. Electrodes may be disposed in the top or the bottom of the chamber and each may be segmented. Oppositely disposed electrodes may be used with at least one dividing wall extending from each electrode to cause reversal of the direction of flow of the liquid metal. The magnetic field may be provided by electromagnets or permanent magnets such as shaded pole permanent magnets.

7 Claims, 4 Drawing Figures

PATENTED APR 9 1974 3,802,262

INVENTOR
BRUCE A. BANKS

BY Norman T. Musial
James A. Mackin
ATTORNEYS

ELECTROMAGNETIC FLOW RATE METER

ORIGIN OF THE INVENTION

This invention was made by an employee of the U.S. Government and may be manufactured or used by or for the Government of the United States for governmental purposes without any payment of royalties thereon or therefor.

BACKGROUND OF THE INVENTION

This invention relates to flow rate measuring devices and is directed more particularly to an electromagnetic flow rate meter for liquid metals.

In the past, one common method of measuring the flow rate of liquid metals as well as other liquids was to measure the volume change per unit time by taking a number of volume readings at known times. Other methods involved measuring the mass of mercury in a reservoir at two different times; measuring the pressure change in a pressurized gas used to displace the liquid metal; directing the liquid through calibrated orifices; and using calibrated porous tungsten vaporizers.

All of the previous devices and methods become increasingly less acceptable for extremely low flow rates such as exist, for example, in spacecraft ion thrusters to which a liquid metal such as liquid mercury is supplied.

Where the flow rate of a liquid is determined by measuring the volume at certain times, timing devices are required to accurately measure the time interval between the volume measurements. When measuring the flow rate of a liquid metal by using a porous tungsten vaporizer, the vaporizer must be kept calibrated and the measurements are made with the assumption that the calibrations remain constant. However, such calibrations have been found to vary undesirably. All of the known prior art methods require either a period of time for thermal response or the necessity of making at least two measurements of mass, volume, height or pressure to obtain values from which the flow rate can be calculated.

OBJECTS AND SUMMARY OF THE INVENTION

It is an object of the invention to provide for flowing liquid metal a flow rate meter having instantaneous response to changes in flow rate.

It is another object of the invention to provide a flow rate meter which will measure extremely low rates of flow of liquid metals.

Still another object of the invention is to provide a liquid metal flow rate meter which produces an electrical current signal which is proportional to the liquid mass or volume flow rate.

Yet another object of the invention is to provide a liquid metal flow rate meter which requires no electrical power input.

An additional object of the invention is to provide a liquid flow rate meter which produces in a short space a relatively high current for driving an indicating device.

DESCRIPTION OF A PREFERRED EMBODIMENT

Figure 1:
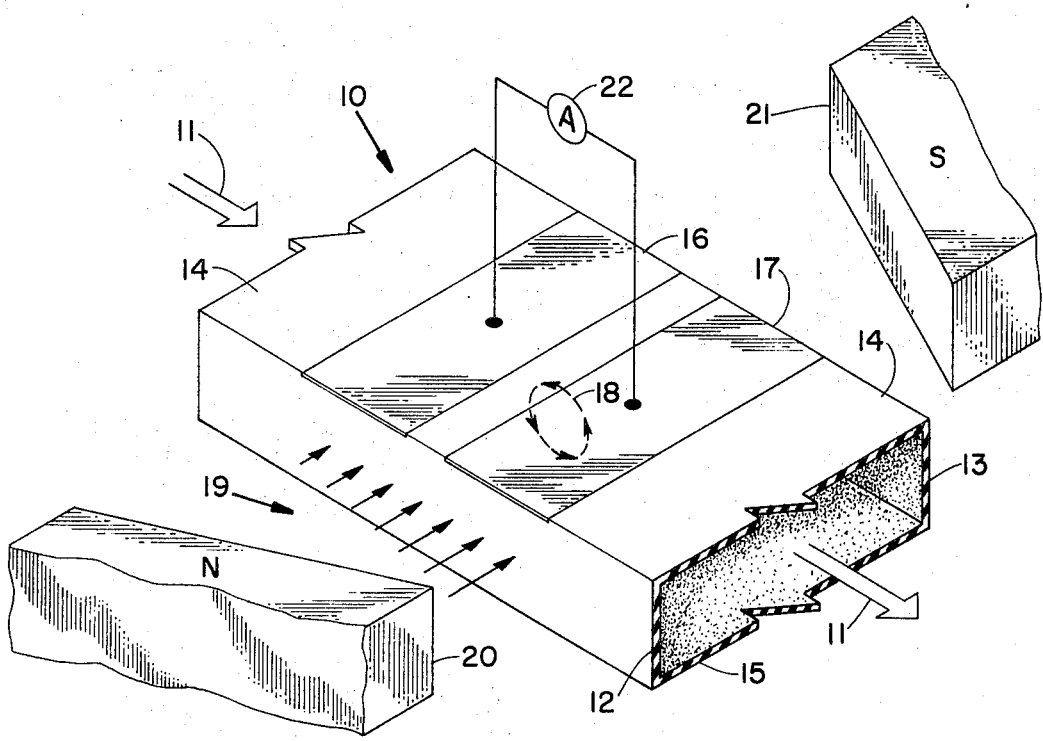
FIG. 1 is a pictorial view of a liquid flow rate meter embodying the invention.

Referring now to FIG. 1, there is shown a chamber 10 which may be disposed in a conduit (not shown) carrying a liquid metal such as liquid mercury, for example. The liquid metal flows through the chamber 10 in the direction indicated by arrows 11.

The particular chamber 10 shown in FIG. 1 is of rectangular shape and is provided with sides 12 and 13 and a top and bottom 14 and 15 of electrically insulating material. A pair of metal electrodes 16 and 17 are disposed in the top 14 perpendicular to the direction of liquid metal flow and are electrically insulated from one another. In the chamber 10 shown in FIG. 1 the electrodes 16 and 17 form a part of the top surface. However, if desired, the top 14 may be a continuous, electrically insulating material with the electrodes 16 and 17 disposed inside the chamber.

The electrodes 16 and 17 are preferably of a metal which will not react chemically with the liquid metal flowing through the chamber. Where the liquid metal is mercury, the electrodes 16 and 17 may be either copper or copper-plated with platinum.

To the end that circulating eddy currents such as depicted at 18 will be created in the flowing liquid metal in the general area of electrodes 16 and 17, a magnetic field 19 is impressed on the chamber 10 in a direction perpendicular to the direction of liquid metal flow and generally parallel to the electrodes 16 and 17. The strength of the magnetic field increases in a downstream direction along the chamber 10 so that the magnetic field has a gradient. This magnetic field gradient may be established by suitable magnetic poles 20 and 21 which are provided with pole faces which taper toward the chamber 10 in a downstream direction of the liquid metal flow. A current indicating means such as ammeter 22 may be connected between the electrodes 16 and 17 to detect eddy currents which are present in the area of the electrodes and the magnetic field. The ammeter 22 is calibrated to measure the flow rate through the chamber 10 and, advantageously, will indicate any instantaneous change in the rate of flow of the liquid metal.

Figure 2:
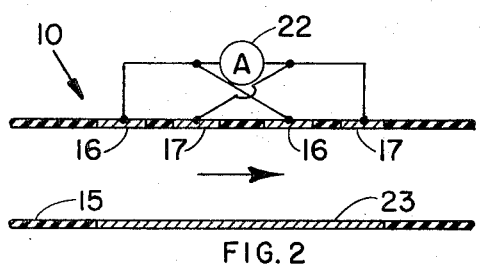
FIG. 2 is a longitudinal cross-sectional view of a flow rate meter having a plurality of electrodes in the top surface.

FIG. 2 is a longitudinal cross-sectional view of the chamber 10 of FIG. 1 except that a metal wall portion 23 is provided in the bottom 15 of the chamber opposite the electrodes 16 and 17 and the electrodes are divided into a plurality of alternate, intermeshed segments. Corresponding parts in FIGS. 1 and 2 are identified by like numerals. The wall portion 23 improves operation of the magnetic flow rate meter and is believed to accomplish this by increasing the eddy currents. As shown, the electrode segments 16 are connected to one side of ammeter 22 while the electrode segments 17 are connected to the other side. Each electrode pair 16, 17 should be relatively close together as compared to the distance between either of the electrodes and the next adjacent electrode of any other electrode pair.

Figure 3:
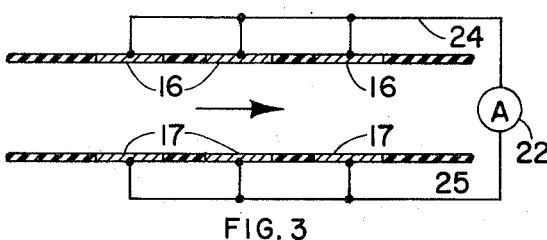
FIG. 3 is a longitudinal cross-sectional view of a liquid metal flow rate meter having a plurality of electrodes in both the top and bottom surfaces.

The longitudinal cross-sectional view of chamber 10 shown in FIG. 3 is similar to that of FIG. 2 and like parts are identified by like numerals. In FIG. 3, electrode 16 is disposed in the top of the chamber while the electrode 17 is disposed in the bottom of the chamber. As shown in FIG. 3, the electrode 16 is divided into a plurality of segments which are all connected by a lead 24 to one side of the ammeter 22. Likewise the electrode 17 is segmented and all the segments are connected by a lead 25 to the other side of the ammeter 22. Segmenting the electrodes improves the operation of the ammeter 22 by providing more current. It will be understood that the electrodes 16 and 17 may be divided up into as many segments as is practical in accordance with good electrical and mechanical engineering practices.

Figure 4:
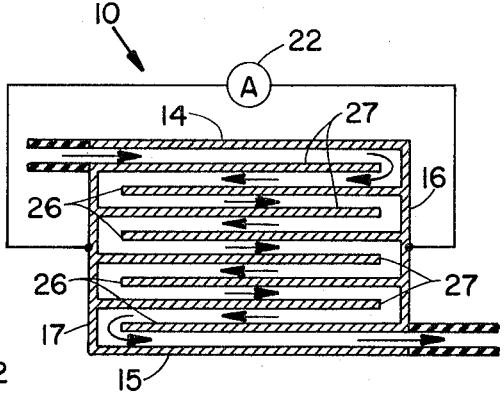
FIG. 4 is a longitudinal cross-sectional view of a liquid flow rate meter in which dividing walls cause flow reversals of the liquid metal in the flow rate meter.

Referring now to FIG. 4, there is shown an embodiment of the invention wherein maximum current is obtained for the ammeter 22 in a relatively short space. Parts in FIG. 4 which correspond to parts in FIG. 1 are identified by like numerals. In FIG. 4, electrode 16 forms an end wall of the chamber 10 while the electrode 17 forms another end wall. Preferably, the top 14 is a contiguous part of the electrode 16 and the bottom 15 is likewise part of the electrode 17. As shown in FIG. 4, a plurality of divider walls 26 extend from electrodes 16 while a plurality of divider walls 27 extend from the electrode 17. All the divider walls extend as far as possible toward the end walls without throttling or restricting flow of liquid metal through the chamber 10. The divider walls cause the flowing liquid metal to reverse direction a plurality of times and, in conjunction with the divider walls 26 and 27 increases the amount of current flowing through the ammeter 22.

Although the liquid current flow reverses a plurality of times while flowing through the chamber of FIG. 4, a magnetic field increases linearly in a direction from electrode 17 toward electrode 16, that is in a downstream direction, is utilized.

It will be understood that changes and modifications may be made to the foregoing flow rate meter without departing from the spirit and scope of the invention as set forth in the claims appended hereto.

What is claimed is:

1. A meter for measuring the flow rate of liquid metals comprising:
    a chamber disposed in a conduit carrying a flow of liquid metal;
    at least first and second elongated metal electrodes disposed in said chamber in contact with and perpendicular to the direction of flow of said liquid metal;
    means for electrically insulating said electrodes from one another;
    means for impressing on said chamber a magnetic field which is perpendicular to the direction of flow of said liquid metal and generally parallel to said electrodes; and which increases in strength in the direction of liquid metal flow; and
    current indicating means connected between said electrodes, said first and second electrode each comprising a plurality of electrically connected segments, the segments of said first electrode being intermeshed with the segments of said second electrode.

2. The structure of claim 1 wherein said first and second electrodes comprise oppositely disposed first and second chamber walls; first dividing wall means extending from said first chamber wall toward said second chamber wall; and
    second dividing wall means extending from said second chamber wall toward said first chamber wall.

3. The structure of claim 1 wherein said magnetic field increases in strength linearly.

4. The structure of claim 1 wherein said current indicating means is an ammeter.

5. The structure of claim 1 wherein said means for impressing a magnetic field comprises a pair of magnetic pole pieces, said chamber being disposed between said pole pieces.

6. The structure of claim 5 wherein said pole pieces are permanent magnets.

7. The structure of claim 6 wherein said pole pieces are provided with faces which taper toward said chamber in a downstream direction of flow of said liquid metal.

* * * * *